United States Patent [19]

Frank et al.

[11] 4,125,319
[45] Nov. 14, 1978

[54] ACTIVE LIGHT CONTROL DEVICE

[75] Inventors: Lee F. Frank; Joseph Y. Kaukeinen, both of Rochester, N.Y.

[73] Assignee: Eastman Kodak Company, Rochester, N.Y.

[21] Appl. No.: 682,305

[22] Filed: May 3, 1976

[51] Int. Cl.² ............................................. G02F 1/28
[52] U.S. Cl. .................................................. 350/362
[58] Field of Search .................. 350/160 R, 150, 362

[56] References Cited
U.S. PATENT DOCUMENTS

| 3,485,621 | 12/1969 | Kazan | 350/160 R |
| 3,813,265 | 5/1974 | Marks | 350/150 |

Primary Examiner—William L. Sikes
Attorney, Agent, or Firm—John D. Husser

[57] ABSTRACT

A light control device comprises a plurality of minute particles, having dipolar and light control characteristics, which are supported in an elastic solid matrix. The particles have a length to width ratio greater than two and are supported in a common orientation across the elastomeric matrix to block (or transmit) incident light. Under application of an electric field across the layer the particles reorient to provide a reverse light control effect. Upon removal of the field the particles quickly return to their original orientation. Image display embodiments utilizing a photoconductor or other image-wise field providing structures are disclosed.

26 Claims, 6 Drawing Figures

ACTIVE LIGHT CONTROL DEVICE

BACKGROUND OF INVENTION

1. Field of Invention

The present invention relates to improved light-control devices of the active type (the term "light" being used herein to refer in the generic sense to infrared, ultraviolet and microwave radiation in the neighboring portions of the electromagnetic spectrum, as well as to visible light). More particularly the invention relates to devices in which an element, comprising field-orientable particles supported within an operative area by an elastomeric medium, is field activated and deactivated to selectively control light, incident on the operative area of the element.

2. Description of Prior Art

Various elements and apparatus have been proposed in the prior art for selectively controlling incident light (e.g., regulating its transmission, reflection, diffraction or absorption) in response to the selective application of an electric or magnetic field to the element. A large number of the apparatus and elements of this kind can be grouped as being either active (i.e., primarily intended for rapid and recurring changes in light control effect) or inactive (i.e., primarily intended for a relatively permanent light control effect).

Typical prior art systems in the inactive group include devices or elements in which a surface deformation pattern is created on a film by heating during application of a corresponding electric field pattern (e.g., an electrostatic image) to the film. After such film deformation, visible light directed towards the film is affected in a manner creating an observable image corresponding to the field pattern. In a similar inactive system, electric-field-orientable, light-control particles are dispersed in heat softenable support and oriented, in an imagewise pattern, by application of a corresponding electric field pattern while heating.

The present invention has certain similarities to the aforedescribed inactive devices and elements, but relates more closely to apparatus and elements of the type generally categorized as active, wherein one particularly desirable attribute is a capability for rapid changeover from one light-controlling format to another.

Active control of light in correspondence with applied electric field, has been the subject of a number of different approaches and utilized in a variety of different environments. Common applications are for use as an electro-to-optical image converter and as an optical-image intensifier.

U.S. Pat. No. 2,290,581 discloses an early electro-to-optical converter in which graphite or aluminum particles suspended in a liquid medium were selectively aligned by a scanning electron gun to modulate the passage of light and provide a viewable image. Similar light control devices, using dipole particles in liquid suspension and orienting electric fields, are disclosed in U.S. Pat. Nos. 3,257,903; 3,512,876 and 3,527,525.

Another approach, disclosed in U.S. Pat. No. 2,457,981, utilizes an array of minute reflective fibers which are momentarily electrostatically charged, point by point with an electron gun, in accordance with a desired image pattern. Light directed onto the array is controllably reflected in accordance with the image pattern due to imagewise flexure of fibers, caused by temporary electrostatic charges from the scanning electron beam.

U.S. Pat. No. 3,100,817 discloses the use of a reflectively coated "electro-elastic" membrane, which changes in thickness (and therefore its optical reflective characteristic) under the influence of an electric field, to convert electrical patterns to viewable ones.

U.S. Pat. No. 3,592,527 discloses the use of an element, comprising a liquid crystal-photoconductor laminate, to intensify light images. This element utilizes the clear-to-diffuse change occurring in liquid crystal under imagewise electric patterns on the photoconductor.

The prior-art approaches, to some extent at least, all suffer a high cost of fabrication, a fragile and cumbersome packaging and chemical instability, thus a high sensitivity to environmental changes, e.g., temperature change. Special optics and limited viewing angles are also common disadvantages of prior art systems. Certain systems, e.g., the flexed fiber system, are not adapted to receive and hold the image signals in parallel, i.e., simultaneously, and rely on a continuous scan which is itself costly and limiting as to field of application.

The dipole particle-liquid suspension systems of the type mentioned above have apparently been developed to a stage of commercial utility; however, one detractive feature of such systems is a slow recovery time, caused by reliance on Brownian movement to return the suspended dipole particles to the unoriented condition.

The patents mentioned above describe only some of the applications in which active light-control devices can be useful; and in view of the deficiencies of prior art devices of this type, it can be seen that a need is present for new and improved light-control devices of the active type described.

SUMMARY OF INVENTION

An object of the present invention is to provide a new and improved device of the type which, in response to a force field, selectively controls the light rays incident on an operative area thereof in a predetermined manner.

Another object of the present invention is to provide such a device having a rapid response and recovery time.

Yet another object of the present invention is to provide an active light-control device which has improved packagability, improved chemical stability and improved environmental sensitivity characteristics, and which is susceptible to more simple and inexpensive fabrication.

A further object of the present invention is to provide an active light-control device having improved functional characteristics, particularly in image display applications.

The above and other objects and advantages are facilitated by the novel structure of our invention which utilizes a control element comprising a plurality of light-control particles supported, across an operative area and in a resiliently yieldable manner, by an elastomeric layer. The particles have lesser and greater physical dimensions and a dipole characteristic which causes a uniform orientation of the particles in an electric field. For example the particles can be minute needle-like ones or elongated scales or flakes, the critical characteristics being a configuration providing both a relatively small and a relatively large obstruction to the passage of light (i.e., silhouettes) and the tendency to align in a common light-blocking or light-transmitting orientation in an electrical field.

The essential features of the supporting layer are solidity for restraining the particles from movement within the layer except under the selective application of external forces (e.g., solidity sufficient to prevent any substantial particle or molecular migration) and an elasticity adequate to allow orientation of the particles under field forces and quickly return the particles to their retained orientation after termination of selectively applied field forces.

In accordance with certain embodiments of the invention, disclosed in more detail below, the control element is employed in cooperation with imagewise field producing means, e.g., photoconductors, discharge stylus, or other electrostatic image generators and image pattern electrodes, to provide new and useful display panels.

BRIEF DESCRIPTION OF DRAWINGS

In the detailed description of preferred embodiments of the invention, set forth below, reference is made to the attached drawings wherein:

FIG. 1-B is a cross section of the element of FIG. 1-A but in an energized condition;

FIG. 2-B is a cross-sectional view of a selectively, electrically-addressable image display device constructed in accordance with an embodiment of the present invention;

DETAILED DESCRIPTION OF PREFERRED EMBODIMENTS

Figure 1A:
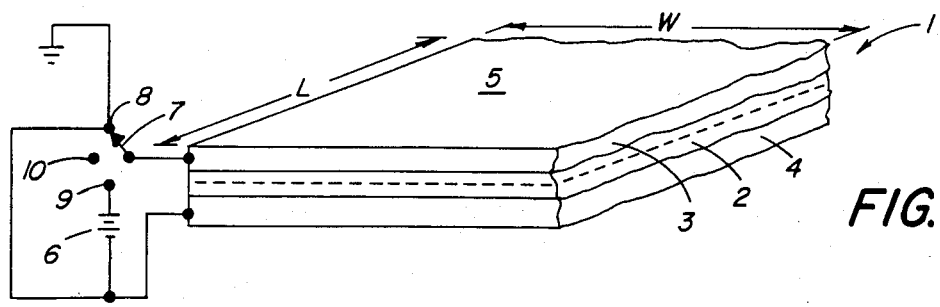
FIG. 1-A is a perspective view showing a cross section in enlarged scale of a simplified light-control element, in accordance with one embodiment of the present invention, in the de-energized condition.
Figure 1B:
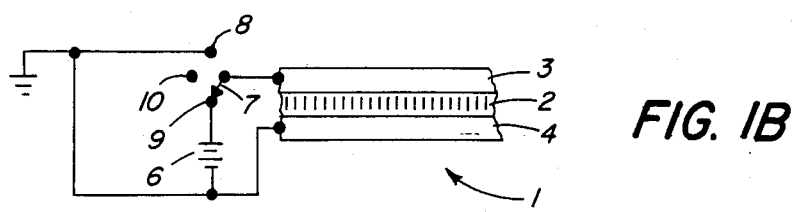

Referring now to FIG. 1-A, the light-control element 1 shown therein comprises an electro-optical layer 2 sandwiched between transparent electrode layers 3 and 4. The electrode layers can be a transparent conductive glass or a transparent plastic film having a substantially transparent conductive coating in contact with the layer 2. The electro-optical layer 2 comprises a matrix of elastomeric material which supports a plurality of light-control particles dispersed across its operative light control area herein illustrated dimensions L and W.

As previously mentioned the light-control particles can be in a variety of forms and of a variety of chemical compositions, the two necessary traits for the particles being a dipole and an acicular characteristic.

The terms "dipole" and "dipolarity" as used herein with respect to light-control particles are intended to include particles having an inherent tendency to orient in an electric or magnetic field because of an electrically polarized molecular structure, as well as conductive and insulative particles having a difference in dielectric constant from the matrix material such that a tendency to orient in such a field is induced in the particles (or in the matrix). Examples and a detailed discussion of the dipole characteristics of such particles in liquid suspensions are set forth in U.S. Pat. No. 3,512,876.

It has been found desirable in practicing the present invention that the particles be of a size less than 25 micrometers in length with an aspect (length/thickness) ratio greater than 2. A particularly preferred particle size range is from 0.1 to 1 micrometers in length with an aspect ratio of 10 to 100. Optically it has been found that particles which are reflective, refractive, absorptive, high-index-scattering or depolarizing to light are useful in practice of the invention, particles having certain combinations of those light controlling characteristics also providing useful and desirable results in some applications.

Aluminum flakes have been found particularly useful in the practice of certain embodiments of the present invention and various specific types of those and other useful particles are set forth in subsequently described examples.

The support layer or matrix for the particles is an elastomeric solid as opposed, for example, to a highly viscous liquid. Solid as used herein means in the solid phase state at the temperatures of intended storage and use conditions. The material should have a modulus of elasticity sufficiently low to facilitate orienting movement of the particles under readily developable field-forces. In embodiments utilizing an electric orienting field, the matrix is desirably electrically insulative to ar extent preventing substantial current flow therethrough at operating voltages and sufficiently elastic to allow orienting movement at operating voltages. That is the modulus of elasticity and electrical resistivity can be matched to allow orienting movement under field without electrical breakdown across the layer. For example, an elastomeric material having a resistivity of about $10^{15}$ ohm-cm has been found to work well in the operating voltage ranges subsequently described. It will be appreciated, however, that dielectric coatings or laminations could be provided for the layer for the purpose of preventing field breakdown. The matrix also is desirably highly light transmissive. Low modulus of elasticity silicone rubbers have been found useful in many embodiments of the present invention; however, other elastomeric materials such as polyurethanes can be readily used in the practice of the invention. Elastomeric material whose Young's modulus is in the range of about $1 \times 10^{-1}$ p.s.i. to $1 \times 10^{-3}$ p.s.i. can be desirably used in the practice of the present invention.

The optimum concentration of light control particles in the elastomeric matrix will vary considerably depending on the size(s) and shape(s) of particles utilized and the application of a particular device. One objective is to obtain a maximum light transmission when the particles are in a non-blocking orientation and a maximum reflection when in the blocking orientation. Another objective when the panel is used in an image display mode is to utilize a minimum particle size to enhance resolution. It has been found however, that a compromise must be accepted in certain instances, since extremely high particle concentration can cause shorting of the electric field across the light control layer. By way of one specific example, when using aluminum flakes $25\mu$ in length and having a specific grvity of about 3 and an aspect ratio of about 10, a desirable particle concentration by weight is about 10%, which corresponds approximately to about $10^6$ particles per cubic centimeter. The subsequent examples provide teachings of various other operable concentrations.

FIG. 1-A illustrates a light-control element constructed in accordance with the present invention in a condition in which no electric field exists between the transparent electrodes 3 and 4 and across electro-optical layer 2, i.e., the voltage from battery 6 is not closed with switch 7 on the ground terminal 8. As shown in that Figure, in the no-field condition, the particles are arranged with their longitudinal axis generally parallel to the light receiving surface 5 of element 1. This orientation or prealignment can be achieved in fabrication by several techniques.

For example, as described in the subsequent working Examples, conventional doctor blade coating of a dispersion of the elastomer and light-control particles on a substrate imparts alignment of the particles in an orientation generally parallel to the substrate surface coated. More precise alignment can be obtained by application of an orienting electric or magnetic field during curing of the elastomer.

Also it will be appreciated that if the field producing electrodes are segmented and the particles are uniformly aligned in elastomer with their longitudinal axes perpendicular to the viewing surface, instead of parallel, a reverse light-control effect can be obtained. That is, reflection of incident light would occur under field energization rather than when the particles were in their relaxed condition in the elastomer.

FIG. 1-B illustrates a cross section of element 1 under the influence of a uniform electric field applied across all portions of the electro-optical layer 2. As shown, in applied-field condition, with switch 7 closing the circuit from the terminal of battery 6 across electrodes 3 and 4, the particles have oriented under the influence of the field with their longitudinal axes generally normal to the light receiving surface 5.

If the switch 7 is then moved to the ground terminal 8, the uniform field across electrodes 3 and 4 is rapidly discharged and the light-control particles are rapidly moved back to their generally parallel orientation, shown in FIG. 1, by the restoring forces of their elastomeric matrix. However, if switch 7 is moved instead to storage terminal 10, the field across electrodes 3 and 4 remains and continues to influence the light-control particles toward their orientation normal to the surface 5.

Considering now the light-control effect of the embodiment just described, if the particles in layer 2 are light reflective aluminum flakes or needles, the element 1, in the de-energized or no-field condition shown in FIG. 1-A, will prevent substantially the passage of light directed onto surface 5, because the particles are oriented with their large dimension across the path of incident light rays. In the energized or field-applied condition shown in FIG. 1-B, however, the element 1 permits passage of a very high percentage of the light rays incident on surface 5 to pass through electro-optical layer 2. It will be appreciated that the simplified embodiment of the invention can be used as an effective light-control valve, e.g., in applications as, or analogous to, a photographic shutter or in applications for controlling the passage of light through control larger panels, such as room windows, to regulate the environment in larger spaces.

Figure 2A:
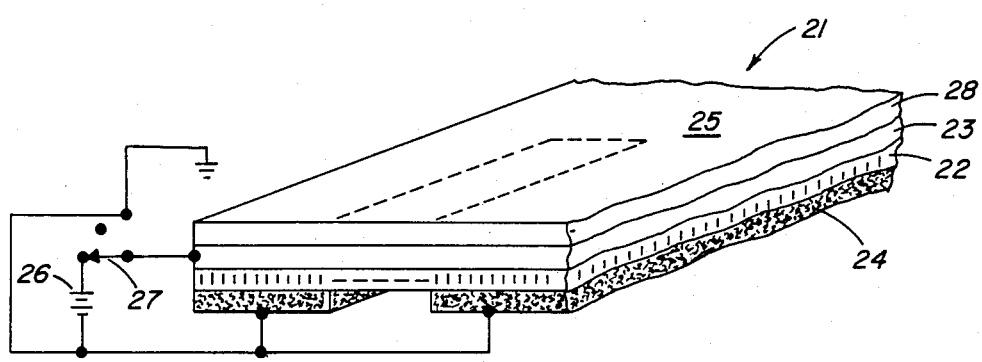
FIG. 2-A is a perspective view of an image display device in accordance with an embodiment of the present invention.
Figure 2B:
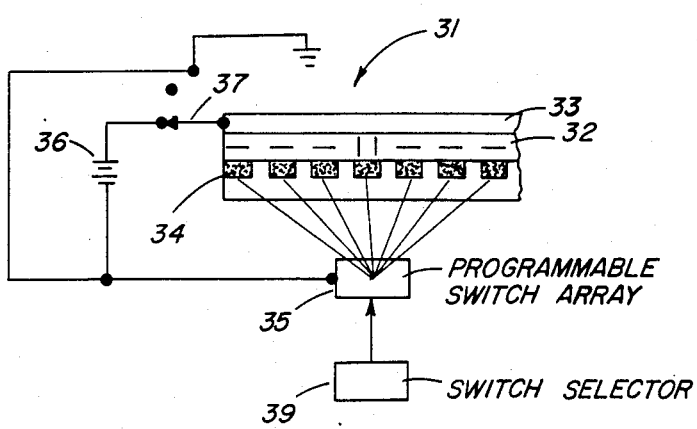

Turning now to FIGS. 2-A and 2-B, embodiments of the invention similar to that in FIG. 1-A are shown; however, in these Figures elements 21 and 31 are constructed for use as information display panels. The element 21 in FIG. 2-A comprises an electro-optical layer 22 having an elastomeric matrix and light-control particles such as described with regard to FIG. 1-A. Layer 22 is sandwiched between a transparent electrode 23, and a patterned electrode 24 formed of a flexible, light-absorbing, conductive sheet, configured to form an image pattern. A flexible transparent plastic film support 28 is provided at least on one outer side of the element 21, here the top side. As illustrated, the light-control particles between transparent electrode and the patterned electrode align, under the field supplied by battery 26, to an orientation normal to the viewing surface 25; the control particles in areas of the matrix having no pattern electrode portion therebeneath are not influenced by any electric field and remain in the reflecting position parallel to the viewing surface 25. Thus light incident on the viewing surface is reflected from portions within the area indicated by broken lines but light incident on other areas of the viewing surface passes through the control layer and absorbed by the black patterned electrode. Storage and erase of the image display can be effected by switch 27 in the same manner as described with respect to FIGS. 1-A and 1-B.

FIG. 2-B discloses an element like that in FIG. 2-A, but capable of a selectable image format. Thus in the FIG. 2-B element, small electrically discrete electrodes 34 are provided to form an addressable array uniformly across the entire surface of the display element 31. The discrete electrodes are each light absorptive as well as conductive. A programmable switch array 35 is provided to selectively couple predetermined of the electrodes 34 to the terminal of electrical source 36 in accordance with a desired image pattern input from switch selector 39; and upon energization of the light-control element by connection of transparent electrode 33 to the source, the light-control particles align in parallel or normal orientations to the viewing surface in accordance with the selectively applied field. Light incident on the viewing surface is thus selectively reflected by the control particles or absorbed by the electrodes 34 to present an image to the viewer. Again the image can be rapidly erased from, or stored on, the element by movement of the control switch 37 to the open or ground position as described above. In embodiments such as just described, an interesting and useful result can be obtained by impressing a high frequency voltage on all electrode elements. In this manner a vibration movement can be imparted to the reflective particles which substantially reduces the "scintillation" effect present in many high gain reflective screens because of interference of light rays within a retina resolvable screen area.

Figure 3:
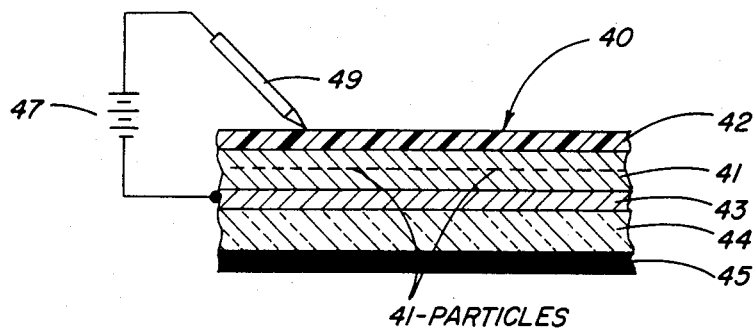
FIG. 3 is a cross-sectional view of an electrostatically addressable image display device in accordance with an embodiment of the present invention.

FIG. 3 illustrates an embodiment of the invention constructed for imagewise address by an electrostatic charge. In this embodiment the light control panel 40 comprises an electro-optical layer 41 such as previously described sandwiched between a transparent insulating film 42 and a transparent electrode 43. A support 44 is affixed to electrode 43 and is rendered light absorbent on one side such as by a black paint layer 45. With a voltage source 47 connected between the electrode 43 and electrode stylus 49, an electrostatic charge can be inscribed on insulating layer 42 in any desired image pattern. The image charge pattern in turn creates a field across the light control layer and orients the particles aligned thereunder normal to the plane of the insulating layer. At this stage the voltage applied to electrode 43 can be disconnected therefrom. As described before, light incident on the insulating layer is thus reflected from areas of the control layer below uncharged areas on the insulating layer but passes through the control layer portions below the electrostatic charge pattern to be absorbed by the black layer 45 on support 44. Erase of the electrostatic charge pattern, e.g., by contact with an electrode connected to electrode 43 such as a conductive cloth removes the field across the control layer 41 and the light control particles beneath the previously charged areas return to their orientation parallel to the insulating layer surface.

It will be appreciated that the element shown in FIG. 3 could be utilized equally advantageously with other devices for forming electrostatic images on insulating layer 42. For example, well known devices exist for transferring an electrostatic image from a photoconductor to layer 44, for forming an electrostatic image on insulating layer 44 by simultaneously exposing and charging a photoconductor in contact with layer 44 and for forming an electrostatic image on layer 44 by imagewise modulation of an ion stream directed towards the insulating layer 44.

Similarly an image can be recorded and displayed on the FIG. 3 device, by placing a conductive template (such as a metalized credit card) with its raised characters in contact with layer 42 and applying a voltage across layer 41 between the card and electrode 43. An analogous recording and display can be obtained by applying a voltage between keys of a typewriter and the conductive layer 43 and "typing" a field image into layer 41.

Figure 4:
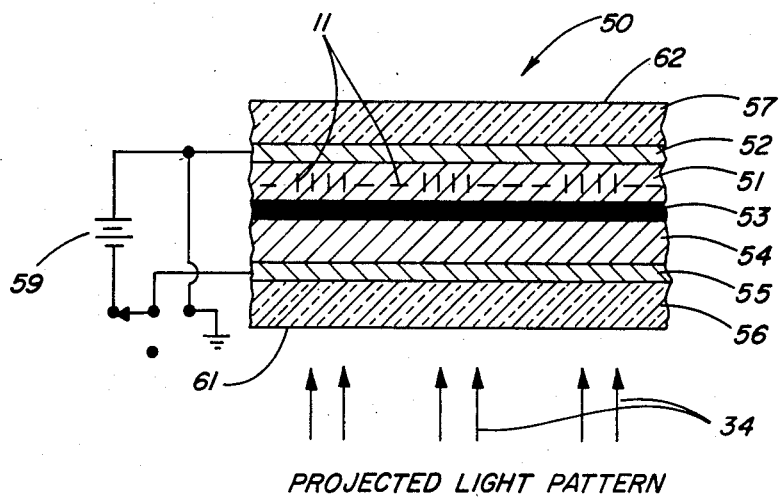
FIG. 4 is a cross-sectional view of a photo-addressable image display device in accordance with an embodiment of the present invention.

FIG. 4 illustrates an embodiment of the present invention which provides a light-addressable image display device. As shown in that Figure, the light-control element 50 comprises electro-optical layer 51, of the type described in regard to previous embodiments, sandwiched immediately between a transparent electrode 52 and a continuous opaque layer 53 which, in this embodiment should be electrically insulative. A photoconductive insulator layer 54, of the type utilized in electrophotography, is provided on the opposite side of the opaque layer 53 from the light control layer 51 and a second transparent electrode 55 is provided on the opposite side of the photoconductive layer 54. Transparent supports 56 and 57 can be provided on the outer sides of the element to protect and electrically insulate the electrode layers.

In operation, with electrode 55 coupled to the voltage source 59 as shown, a light image is projected onto the rear surface 61 of the light-control element 50. The light-portions of the image pass through support 56 and transparent electrode 55 and render the portions of the photoconductor, on which they are incident, electrically conductive so as to provide an imagewise electric field across the electro-optical layer, in areas corresponding to the light image portions. The imagewise field across the electro-optical layer in turn effects orientation of the reflective light control particles aligned thereunder in a direction normal to the viewing surface 62, while the particles aligned with non-conductive areas of the photo-conductor remain in a relaxed orientation, parallel to the viewing surface 62. It can be seen therefore that when light is directed uniformly onto the entire viewing surface 62 from the side opposite the projected light pattern, a readily viewable image pattern is provided, which is the reverse of the projected light pattern. That is, light passing into the electro-optical layer 51 is reflected by particles parallel to the viewing surface (resulting in light viewable image portions where the projected image portions had been dark) and transmitted by particles normal to the viewing surface to be absorbed by opaque layer 53 (resulting in dark viewable image portions where projected image portions had been light). It will be appreciated that the display element just described is particularly suitable for uses where project negative images (such as, e.g., negative microfilm) is to be viewed, for the reverse image presented resembles the original page with light background and dark characters. In such an embodiment the opaque layer 53 functions for protecting the photoconductive layer from ambient light from the viewing side of element 50, as well as providing the light absorptive medium for image display.

If it is desired to store the image in the display panel, the electrode can be moved to the open circuit position. Subsequent images can then be retrieved and positioned for projection while the stored image remains viewable. To erase the stored image, the electrode 55 can be coupled to ground and the photoconductor subjected to an overall erase illumination. However, in certain embodiments it has been found desirable to apply a reverse polarity, uniform field to the light-control layer, e.g., by applying an opposite polarity voltage to electrode 55 and flood exposing photoconductor 54 through support 56 and electrode 55.

Having now described certain more general features, embodiments and applications of the present invention, the following more specific working Examples of embodiments of the invention are set forth to further amplify the reader's understanding of the invention.

In the following Examples, certain commercially available materials utilized are identified by source designation, and certain of those materials are identified below, together with their source:

(1) RTV 619A — a silicone resin manufactured by General Electric Company
(2) RTV 910 — a diluent also manufactured by General Electric Company
(3) RTV 619B — a hardener manufactured by General Electric Company
(4) No. 200, Cres-lite brand aluminum leaf — a superfine aluminum leaf manufactured by the Crescent Bronze Powder Company
(5) F-1-3523 — a resin manufactured by Dow Corning Company
(6) Pearl Luster — a material manufactured by American Handicrafts Warehouse, Ft. Worth, Tex.
(7) Sylgard 182 — a solventless, silicone resin and curing agent for potting, filling, embedding and encapsulating manufactured by Dow Corning Company.

The following examples serve to show the merits and practicality of the invention and to provide certain guidelines within which the invention might be practiced; however, it should be borne in mind that the Examples are merely illustrative and are not intended to limit the scope of the invention.

EXAMPLE 1

An electro-optical display panel comprising a low modulus elastomer having aluminum flakes dispersed therein was made as follows:

Silicone resin (RTV 619A), in the amount of 14 grams, and 0.05 grams of aluminum flakes (Cres-lite brand No. 200) were mixed together with an ultrasonic generator probe for about 10 minutes. Then 1.4 grams of hardener RTV 619B was hand-stirred into the dispersion, and the dispersion was knife-coated on a 0.004 inch poly(ethylene terephthalate) support containing a sublimed conducting layer of Cr and SiO of 0.1 optical density. The doctor blade thickness was 0.006 inches and the temperature of the coating block was 140° F. The high viscosity of the dispersion created a rolling of material immediately preceding the knife and the long dimension of the aluminum flakes aligned tangentially to the rolling material and, hence, laid parallel to the support after passing beneath the knife. Next the coating was allowed to cure for 2 hours on the coating block at 140° F., and a 0.0005 inch Mylar film was rolled, in a manner minimizing the trapping of air bubbles, into contact with one surface of the elastomer layer, and thus bonded to the elastomer dispersion. In operation, the Mylar film acted both as a protective cover and as an electrical barrier layer. Next, a shaped, black electrode was secured to portions of the Mylar film to provide an electric field across selected portions of the multilayer and to provide an absorption means for the ambient light passing the field oriented aluminum flakes.

A 1.5 kV DC voltage was applied across the conducting layer and the electrode, the aluminum flakes aligned making those areas appear black when viewed from the side opposite the black electrode. The non-field areas remained silvery-white in color. When the voltage was removed and the panel remained open-circuited, the image remained. Visually, an image was stored for as long as 5 minutes, but some image degradation was observed after 1 minute. When a small resistance path was provided to ground from the transparent conductive layer, the image was erased by inherent restoring force of the elastomer matrix which returned the flakes to their original position. The element was thus restored to its overall silvery-white appearance on the viewing side. The "on" and "off" time for this panel was measured to be about 10 milliseconds by pulsing the electric field with a square wave and observing the resulting reflectivity of the panel with a photocell. When the 1.5 kV DC voltage was replaced with a 1.2 kV AC (rms), 60 Hz voltage, a comparable electro-optical image was observed.

Microscopic examination of the elastomer layer with reflected light revealed the angular rotation of the flakes or particles under the electrical field condition and their return in the non-field condition. The flakes were random in size and shape, but most showed a high reflectance in the no-field condition when the illumination was generally perpendicular to the viewing surface. This confirmed that the shearing action during the coating operation aligned the flakes as described.

EXAMPLE 2

A second electro-optical display device having a thinner, lower modulus elastomer and a higher concentration of aluminum flakes was fabricated and tested generally as outlined in Example 1. The layer composition was:

14 g Silicone resin — (RTV 619A)
4 g Diluent — (RTV 910)
0.1 g Aluminum flakes — (Cres-lite No. 200)
2 g Hardener — (RTV 619B)

The mixing and coating conditions were as in Example 1, but the coating knife was 0.004 inches instead of 0.006 inches. The laminal structure was made as described in Example 1 and a good visual contrast image was observed at 600 volts DC, instead of the 1500 volts used in Example 1.

EXAMPLE 3

A portion numeric display device was fabricated using the elastomer layer set forth in Example 1. Six individual numerals were cut from black conducting material and heat sealed in a side-by-side array between two pieces of 0.0005 inch Mylar film adhered by a 0.0005 inch thermoadhesive. Narrow electrical leads were brought from each of the numerals to the edge of the lamination. This lamination was rolled in contact with the elastomer layer instead of the 0.0005 inch Mylar film and electrode set forth in Example 1. Since the black numerals were slightly visible through the relaxed or aligned aluminum flakes, the side of the assemblage next to the numerals was painted black. A battery power supply, adjusted to output 3 kV, was coupled to the numerals' leads and the numerals could be intermittently made visible or non-visible from the side opposite the black electrodes by momentarily applying the voltage between the electrodes, or shorting it; or they could be stored for as long as 5 minutes by opening the circuit after application of the voltage.

EXAMPLE 4

Six dispersions were made and tested in a manner similar to that described in Example 1; however, the dispersions were ball milled for about 4 days before the hardener was added.

(a) 10 g of the ball milled dispersion described below was combined with 1 g of hardener (F-1-3523 Dow Corning Co.) and then coated with a 0.004 inch doctor blade:
 80 g Resin — (F-13523 Dow Corning Co.)
 0.8 g Aluminum flakes - (Cres-lite No. 200)

(b) 10 g of the following ball milled dispersion was combined with 0.9 g of RTV-619B curing agent and coated with a 0.004 inch doctor blade:
 20 g Silicone resin — (RTV 619A)
 8 g Diluent — (RTV 910)
 0.5 g Aluminum flakes — (Cres-lite No. 200)

(c) 10 of the following ball milled dispersion was combined with 0.9 g of hardener (RTV 619B) coated with a 0.008 inch doctor blade:
 20 g Silicone resin — (RTV 619A)
 6 g Diluent — (RTV 910)
 0.26 $Fe_3O_4$ powder (1–10 micrometer in length)

(d) 10 g of the following ball milled dispersion was combined with 0.9 g of hardener (RTV 619B) and coated with a 0.006 inch doctor blade:
 20 g Silicone resin — (RTV 619A)
 6 g Diluent — (RTV 910)
 0.26 g $MgFe_2O_4$ (magnesium ferrite powder) viz Mapico EG-1 marketed by Cities Service Co.

(e) 10 g of the following ball milled dispersion was combined with 0.8 g of curing agent (F-1-3523 Dow Corning) and coated with a 0.004 inch doctor blade:
 70 Resin (F-1-3523 — Dow Corning)
 21 g Diluent — (RTV 910)
 1.82 g Aluminum flakes — (Cres-lite No. 200)

(f) A layer was made by gently mixing the following three ingredients together and coating with a 0.004 inch doctor blade
 10 g Silicone resin — (RTV 619A)
 1 g Pearl Luster
 1 g Hardener — (RTV 619B)

The six coatings were tested in an assemblage configuration as described in Example 1 with all of them showing a visual response, but none as good as the one disclosed by Example 1. The third dispersion (c) was black in color so a white backing was used for observation.

EXAMPLE 5

The elastomer layer of Example 1, coated upon a thin conductive coating of a transparent support was provided; and a 0.001 inch Mylar film was attached to the side of the elastomer layer opposite the conductive layer. This element was used as a means for temporary storage of a stylus-addressed image. An opaque layer was provided over the outer surface of the rear support so that a cross section of the laminated element appeared as shown in FIG. 3. To form a line image, a 3 kV, DC power supply was connected to the conductive layer and to a stylus having a metal tip. The metal tip was moved over the surface of the Mylar film. The imaginary line drawn by the stylus was instantly visible as a black line on a silvery-white background due to the reorientation of the aluminum flakes in the electric field. This black-on-white image could be stored for about 5 minutes or erased at any time discharging the electrostatic field on the Mylar film with a flexible conducting layer. The device was ready for another image immediately after erasing. The opposite reproduction sense was obtained by first uniformly electrostatically charging the Mylar film of the layer, thus making the layer appear black, and then selectively discharging with the metal stylus. This procedure resulted in silvery-white lines on a black background.

EXAMPLE 6

An improved electro-optical display device compared to Example 1 was made by positioning the aluminum flakes only in the middle portion of the elastomer layer, effected by superimposing, multiple coatings on the same conducting support. Specifically, the coatings comprises an elastomeraluminum flake dispersion coated on one layer of the elastomer only and then overcoated with another layer of the elastomer. The aluminum flake dispersion was made as described in Example 1 and composed of:

10 g Silicone resin (RTV 619A)
1 g Hardener (RTV 619B)
0.17 g Aluminum leaf (Cres-lite No. 200)

The outer elastomer layers contain the same ratio of silicone resin and hardener, but no aluminum flakes. The multiple-coating element was made by first coating the elastomer with a 0.002 inch doctor blade onto the surface of a 0.004 inch poly(ethylene terephthalate) support that had a sublimed conducting layer of Cr and SiO. Next, using a 0.004 inch doctor blade, the aluminum flake dispersion was coated over the first elastomer layer providing an additional 0.002 inch layer. Finally, a 0.006 inch doctor blade was employed to coat another 0.002 inch elastomer layer, like the first one, over the flake dispersion layer. This multilayer structure was cured at 140° F. for one hour followed by an overnight cure at room temperature, then at 140° F. for an additional 4 hours.

For testing, an assemblage was constructed as in Example 1 and the reflectivity of this structure was compared to the one described in Example 1 as a function of applied voltage. The table below shows the results:

| Applied Voltage (kV) | Reflectivity (as a percentage of the reflectivity of bond paper) | |
|---|---|---|
| | Ex. 1 (%) | Ex. 6 (%) |
| 0 | 13 | 29 |
| 1 | 12 | 16 |
| 2 | 8 | 5 |
| 3 | 6 | 3 |

EXAMPLE 7

Two photo-addressable light-control devices such as shown in FIG. 4 were constructed and utilized for image display. The first device utilized a photoconductive member comprising a 20 micron, organic aggregate, photoconductive insulative layer of the type described in U.S. Pat. No. 3,615,414 supported on an insulative film support with a thin, evaporated, transparent conductive layer therebetween. An optical barrier layer comprising a dispersion of the following materials 2.9 g Amberol
5.8 g Beckosol
3.7 g Carbon Black Regal
0.6 g Monastral Blue
0.1 g Staybelite Resin
24.0 g Cyclohexane was ball milled with 60 ml of ⅜ inch steel balls for 5 days at 40° C. and 160 rpm and coated on the photoconductive layer with a 0.003 inch doctor blade. The dry thickness of the layer was about 8 microns and it had an optical transmission density greater than 5.

The photoconductor for the second element comprised a 100 micron layer of CdS in a binder. The optical barrier layer for the second element was a hot melt, carbon dispersed polyethylene coated on the photoconductor.

The electro-optical layer for each of the devices was prepared and coated in three passes, as in Example 6, so that the aluminum flakes resided only in the middle of the elastomer layer. The specific ingredients were as follows:

15 g Silicone resin (Sylgard 182)
0.3 g Curing Agent (Sylgard 182)
0.17 g Aluminum flakes — (Cres-lite No. 200)

In each instance the electro-optical panel was rolled in contact with the opaque, overcoated phtoconductors after curing. No additional adhesives were needed.

In operation, a negative microimage, with clear letters on a black background, was projected through the photoconductor's support while a voltage was applied across the composite in the manner shown in FIG. 4. The tungsten, white light intensity of the illumination source was about 20 fc. For the case of the organic photoconductor, an applied DC voltage of about 1 kV resulted in an image which was not easily erasable. For the inorganic-binder photoconductor, a 60 Hz, 1 kV voltage was used and the resulting negative-to-positive image was of fair quality. It took a few seconds to form or erase the latter image, which was probably a consequence of the response time of the photoconductor.

With respect to the materials of the barrier layer described in the foregoing example, Amberol is a registered trademark of Rohm and Haas to designate an unmodified phenol-formaldehyde resin. Beckosol is a registered trademark of Reichold Chemical Co. to designate a soya-modified alkyd resin containing 42% phthalic anhydride and 41% soya fatty acids. Staybelite is a registered trademark of Hercules Powder Co. to designate a commercial hydrogenated wood resin.

From the foregoing description, it will be appreciated that light-control devices in accordance with the present invention provide advantages in performance, fabrication and capability over similar or analogous prior art devices. It is to be understood that although the specific examples disclosed utilized particular elements, e.g., electric fields and visible light, the invention can be used with advantages in other equivalent systems such as those using magnetic fields and magnetically orientable particles or those using other forms of addressing radiation such as, e.g., Xrays and Xray sensitive, PbO photoconductors.

The invention has been described in detail with particular reference to preferred embodiments thereof but it will be understood that variations and modifications can be effected within the spirit and scope of the invention.

We claim:

1. Improved active light control apparatus comprising:
    (a) a light control layer including a solid elastomeric matrix and a plurality of minute dipole light control particles supported by said matrix; and
    (b) means for selectively providing an electric field across said control layer.

2. An improved active light control device comprising a matrix layer and a plurality of dipole particles supported by said layer,
    (a) said matri layer being formed of an elastomeric, solid material; and
    (b) said dipole particles having a light controlling characteristic, a length less than 25 micrometers and an aspect ratio greater than 2 and being supported by said matrix in a common orientation and in a generally uniform concentration across said layer.

3. The invention as defined in claim 2 wherein said matrix layer is substantially light transparent and has a Young's modulus in the range of about 0.1 to 0.001 lbs/in$^2$.

4. The invention as defined in claim 2 wherein said particles have a length in the range of about 0.1 to 1 micrometer and an aspect ratio in the range of about 10 to 100.

5. The invention as defined in claim 2 wherein said matrix layer material is silicone rubber.

6. The invention as defined in claim 2 wherein said matrix layer material is electrically insulative.

7. An improved active ligh control device comprising a transparent matrix layer and a plurality of minute particles having a light control characteristic and disposed substantially uniformly, in orientation and concentration, across said matrix;
    (a) said particles having a length in the range of about 0.1 to 1 micrometer and an aspect ratio in the range of about 10 to 100; and
    (b) said matrix layer being formed of a solid material having a Young's modulus in the range of about 0.1 to 0.001 lbs/in$^2$.

8. The invention as defined in claim 7 wherein said matrix layer is electrically insulative.

9. The invention as defined in claim 7 further including a layer of dielectric material contiguous said matrix layer and means for selectively creating an electrical field across said layers.

10. The invention defined in claim 1 wherein said matrix is light transparent and electrically insulative and has a Young's modulus in the range of about 0.1 to 0.001 lbs/in$^2$ and wherein said particles have a length in the range of about 0.1 to 1 micrometer and an aspect ratio in the range of about 10 to 100 and are disposed in generally uniform concentration and orientation across said matrix.

11. Active image display apparatus comprising:
    (a) a light control layer including a solid elastomeric matrix and a plurality of dipole, light-control particles supported by said matrix; and
    (b) mean for providing an electric field across said layer in a pattern corresponding to an image to be displayed.

12. The invention defined in claim 11 further including an electrically insulative layer contiguous said light control layer.

13. The invention defined in claim 11 wherein said field providing means includes a photoconductive insulator layer.

14. The invention defined in claim 11 wherein said field providing means includes a pattern electrode on one side of said light control layer and a transparent electrode on the opposite side of said light control layer.

15. The invention defined in claim 14 wherein said pattern electrode includes a programmable electrode array.

16. The invention defined in claim 11 wherein said field providing means includes a dielectric layer on one side of said light control layer, an electrode layer on the opposite side of said light control layer from said electrode layer and means for providing an electrostatic charge pattern on said dielectric layer.

17. Improved image display apparatus comprising:
    (a) a light control layer including:
        (i) a matrix of a transparent, electrically-insulative, solid material having a Young's modulus in the range of about 0.1 to 0.001 lbs/in$^2$; and
        (ii) a plurality of dipole particles having a light control characteristic support by said material in a resiliently yieldable manner, said particles having a length less than 25 micrometers and an aspect ratio greater than 2 and being located across said matrix in generally uniform orientation and concentration;
    (b) a photoconductor layer;
    (c) a pair of transparent electrode layers sandwiching the previously recited layers, one of said electrodes being electrically coupled to said photoconductor layer;
    (d) means for applying an electrical potential between said electrode layers; and
    (e) means for exposing said phtotconductor to a imagewise light pattern, whereby an electric field pattern, corresponding to said light pattern is provided across said light control layer of magnitude sufficient to reorient said particles in accordance with said pattern.

18. The invention defined in claim 17 further including a dielectric layer between said electrodes and contiguous said light control layer.

19. The invention defined in claim 17 further including means providing a light opaque barrier on one side of said light control layer.

20. The invention defined in claim 19 wherein said light barrier is on the same side of said light control layer as said photoconductor layer.

21. The invention defined in claim 17 further including means for removing said electrical potential in a manner storing said electric field pattern.

22. An improved device for selectively controlling incident light, said device comprising:
(a) a low Young's modulus, elastic matrix layer having a generally uniform thickness and length and width dimensions which provide an operative light control area therewithin;
(b) a plurality of minute, dipole particles, each with a longitudinal axis and a common light control characteristic, said particles being:
(i) retained in situ by the elastic layer with their longitudinal axes in a common orientation with respect to the plane of said light control area; and
(ii) dispersed generally uniformly across said light control area of said elastic layer in a concentration such that said particles intercept a major portion of light incident on the operative area when in a first intercepting orientation generally parallel to said light control area and allow a major portion of such incident light to pass without interception when in a second transmissive orientation generally normal to said light control area; and
(c) means for applying a field across said matrix layer 23. The invention defined in claim 21 wherein said matrix layer has an electrical resistivity and a Young's modulus such that said dipole particles can be selectively moved between said first and second orientations in response to application of a field across said matrix layer without electrical breakdown across said layer.

24. The invention defined in claim 22 wherein said field applying means includes at least one conductive electrode on one side of said matrix layer and means for providing an activating electric potential between said electrode and the side of said matrix opposite said electrode.

25. The invention defined in claim 22 wherein the Young's modulus of said matrix layer and said potential providing means are matched so that said dipole particles are moved, under stress of said matrix layer, from one of said first and second orientations to the other of said orientations during application of said field and moved back to, and retained, in said one orientation by said matrix layer when said activating potential is removed across said matrix.

26. The invention defined in claim 22 field applying means includes a photoconductor.

* * * * *